(12) United States Patent
Ogata

(10) Patent No.: US 12,073,718 B2
(45) Date of Patent: Aug. 27, 2024

(54) IMPORTANT REGION SETTING DEVICE, ENCODING DEVICE, NETWORK CAMERA, IMPORTANT REGION SETTING METHOD, AND PROGRAM RECORDING MEDIUM

(71) Applicant: NEC Corporation, Tokyo (JP)

(72) Inventor: Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 41 days.

(21) Appl. No.: 18/017,564

(22) PCT Filed: Jul. 31, 2020

(86) PCT No.: PCT/JP2020/029392
§ 371 (c)(1),
(2) Date: Jan. 23, 2023

(87) PCT Pub. No.: WO2022/024332
PCT Pub. Date: Feb. 3, 2022

(65) Prior Publication Data
US 2023/0298463 A1    Sep. 21, 2023

(51) Int. Cl.
*G08G 1/04* (2006.01)
*G06V 20/52* (2022.01)
*H04N 19/167* (2014.01)

(52) U.S. Cl.
CPC .............. *G08G 1/04* (2013.01); *G06V 20/52* (2022.01); *H04N 19/167* (2014.11)

(58) Field of Classification Search
CPC ...... G08G 1/04; G08G 1/09623; G06V 20/52; H04N 19/167; H04N 5/225; G06K 9/00825; G06K 9/00818; B60R 11/04
See application file for complete search history.

(56) References Cited

U.S. PATENT DOCUMENTS

2018/0365991 A1* 12/2018 Yamanoi ............ G08G 1/09623

FOREIGN PATENT DOCUMENTS

| CN | 1440005 A | * | 9/2003 |
|---|---|---|---|
| JP | H11-203590 A | | 7/1999 |
| JP | 2014-216831 A | | 11/2014 |
| JP | 2016-111695 A | | 6/2016 |
| JP | 2016-130099 A | | 7/2016 |
| JP | 2018-063680 A | | 4/2018 |

OTHER PUBLICATIONS

International Search Report for PCT Application No. PCT/JP2020/029392, mailed on Oct. 20, 2020.
English translation of Written opinion for PCT Application No. PCT/JP2020/029392, mailed on Oct. 20, 2020.

* cited by examiner

*Primary Examiner* — Omeed Alizada
(74) *Attorney, Agent, or Firm* — Sughrue Mion, PLLC

(57) ABSTRACT

This important region setting device is provided with: a means for changing an important region within a region that can be imaged by a predetermined camera, in accordance with the illumination state of a lamp in a predetermined traffic signal; and a means for notifying the important region to the camera or to a device which transmits images captured by the camera.

7 Claims, 18 Drawing Sheets

Fig. 7

| STEP NUMBER | IMPORTANT REGION 1 | IMPORTANT REGION 2 | IMPORTANT REGION 3 | ⋮ | REMARKS |
|---|---|---|---|---|---|
| 1 | REGION 1 | – | REGION 3 | | VEHICLE SIGNAL: BLUE<br>PEDESTRIAN SIGNAL: BLUE |
| 2 | REGION 1 | – | REGION 3 | | VEHICLE SIGNAL: BLUE<br>PEDESTRIAN SIGNAL: BLUE FLASH |
| 3 | REGION 1 | – | REGION 3 | | VEHICLE SIGNAL: BLUE<br>PEDESTRIAN SIGNAL: RED |
| 4 | REGION 1 | REGION 2 | REGION 3 | | VEHICLE SIGNAL: YELLOW<br>PEDESTRIAN SIGNAL: RED |
| 5 | – | REGION 2 | REGION 3 | | VEHICLE SIGNAL: RED (ALL RED)<br>PEDESTRIAN SIGNAL: RED (ALL RED) |
| 6 | – | REGION 2 | REGION 3 | | VEHICLE SIGNAL: RED<br>(CROSS DIRECTION: BLUE)<br>PEDESTRIAN SIGNAL: RED<br>(CROSS DIRECTION: BLUE) |
| ⋮ | → | → | → | | DURING THIS PERIOD, ONLY THE SIGNAL IN THE CROSS DIRECTION CHANGES ↔ |
| N−1 | – | REGION 2 | REGION 3 | | VEHICLE SIGNAL: RED<br>(CROSS DIRECTION: YELLOW)<br>PEDESTRIAN SIGNAL: RED<br>(CROSS DIRECTION: RED) |
| N | REGION 1 | – | REGION 3 | | VEHICLE SIGNAL: RED (ALL RED)<br>PEDESTRIAN SIGNAL: RED (ALL RED) |

Fig. 12

| IMPORTANT REGION CHANGE CONDITION | IMPORTANT REGION 1 | IMPORTANT REGION 2 | IMPORTANT REGION 3 | ⋮ |
|---|---|---|---|---|
| VEHICLE SIGNAL: BLUE PEDESTRIAN SIGNAL: BLUE | REGION 1 | – | REGION 3 | |
| VEHICLE SIGNAL: YELLOW PEDESTRIAN SIGNAL: RED | REGION 1 | REGION 2 | REGION 3 | |
| VEHICLE SIGNAL: RED PEDESTRIAN SIGNAL: RED | – | REGION 2 | REGION 3 | |
| VEHICLE SIGNAL: RED PEDESTRIAN SIGNAL: THREE SECONDS AFTER RED | REGION 1 | REGION 2 | REGION 3 | |

IMPORTANT REGION SETTING DEVICE, ENCODING DEVICE, NETWORK CAMERA, IMPORTANT REGION SETTING METHOD, AND PROGRAM RECORDING MEDIUM

This application is a National Stage Entry of PCT/JP2020/029392 filed on Jul. 31, 2020, the contents of all of which are incorporated herein by reference, in their entirety.

TECHNICAL FIELD

The present invention relates to an important region setting device, an encoding device, a network camera, an important region setting method, and a program recording medium.

BACKGROUND ART

PTL 1 discloses a traffic monitoring television system for investigating a cause of a traffic accident near an intersection, grasping and resolving a traffic congestion situation, detecting a violation vehicle such as ignoring a traffic light, or the like. This PTL discloses a configuration in which at least two pieces of information of signal state information about a traffic signal light and video from a monitoring TV camera provided at an intersection are obtained in association with each other, and the lighting state of the traffic signal light is displayed in a screen of the TV camera.

PTL 2 discloses an encoding device capable of reducing storage capacity by setting a first region for performing encoding with high image quality and a second region other than the first region for an image to be encoded and performing encoding. PTL 3 discloses a method of identifying a related region corresponding to the first region in PTL 2. Claim 2 of PTL 3 describes that the related region can include an object such as a person, a face, an animal, a vehicle, a license plate, a window, a door, or a gate, or an object carried by a person. Further, paragraph 0011 of PTL 3 describes that encoding is performed on the related region by applying a low compression rate. A technique of providing an attention region in this type of images is also attracting attention in an automatic driving technique or the like as a region of interest (hereinafter, also referred to as "ROI").

On the other hand, information and communication technology (ICT) infrastructure represented by fifth generation mobile communication systems (5G) is being developed. As a result, the hurdle in achieving the traffic control network disclosed in PTL 1 is lowered.

CITATION LIST

Patent Literature

[PTL 1] JP 11-203590 A
[PTL 2] JP 2014-216831 A
[PTL 3] JP 2016-111695 A

SUMMARY OF INVENTION

Technical Problem

The following analysis is given by the inventor. In the traffic monitoring television system as disclosed in PTL 1, as the number of connected cameras increases, the amount of available information increases, but on the other hand, there is a problem that the monitoring load increases. For example, in the configuration of PTL 1, a video signal transmitted from a monitoring TV camera is displayed on a monitor (reference numeral 51) of a traffic control center as a video signal with a traffic signal light pattern. Since there is a limit to videos that can be monitored by one person, as the number of monitoring TV cameras increases, it is necessary to increase the number of persons in the traffic control center or take measures using automatic recognition technology or the like.

According to the configuration of PTL 2, by setting the mask information (flag) related to each monitoring device, the high image quality region is provided in the image to be encoded and the storage capacity is reduced, which cannot directly solve the above-described problem. PTL 3 discloses that the related region is set around the related object, but in the same configuration, since the related region is set as long as the related object appears, there is a possibility that an appropriate region cannot be set in the image captured by the camera installed in a location where the situation may change from moment to moment.

An object of the present invention is to provide an important region setting device, an encoding device, a network camera, a method of setting an important region, and a program recording medium capable of appropriately setting an important region with respect to an image obtained by a camera installed in a location where a situation can change from moment to moment.

Solution to Problem

According to a first viewpoint, there is provided an important region setting device including a means configured to change an important region within a region covered by a prescribed camera according to a lighting state of a lamp of a prescribed traffic signal, and a means configured to notify the camera or a device that transmits an image captured by the camera of the important region.

According to a second viewpoint, there is provided an encoding device that encodes an image captured by a predetermined camera using the important region notified by the above-described important region setting device.

According to a third viewpoint, there is provided a network camera including a camera, a means configured to change an important region within a region that the camera is allowed to image according to a lighting state of a lamp of a predetermined traffic signal, and a means configured to encode an image captured by the camera using the important region.

According to a fourth aspect, there is provided an important region setting method of executed by a computer, the method including changing an important region within a region that the camera is allowed to image according to a lighting state of a lamp of a predetermined traffic signal, and notifying a device that transmits an image captured by the camera of the important region. This method is linked to a specific machine called a computer that notifies a device that transmits an image captured by a camera of an important region.

According to a fifth point of view, a computer program for implementing the functions of the computer described above is provided. The computer program can be recorded in a computer-readable (non-transitory) storage medium. That is, the present invention can also be embodied as a computer program product.

Advantageous Effects of Invention

According to the present invention, it is possible to appropriately set an important region in an image obtained by a camera.

BRIEF DESCRIPTION OF DRAWINGS

FIG. 7 is a diagram illustrating an example of setting information held by the traffic signal control device according to the first example embodiment of the present invention.

FIG. 12 is a diagram illustrating an example of setting information held by a traffic signal control device according to the third example embodiment of the present invention.

EXAMPLE EMBODIMENT

Figure 1:
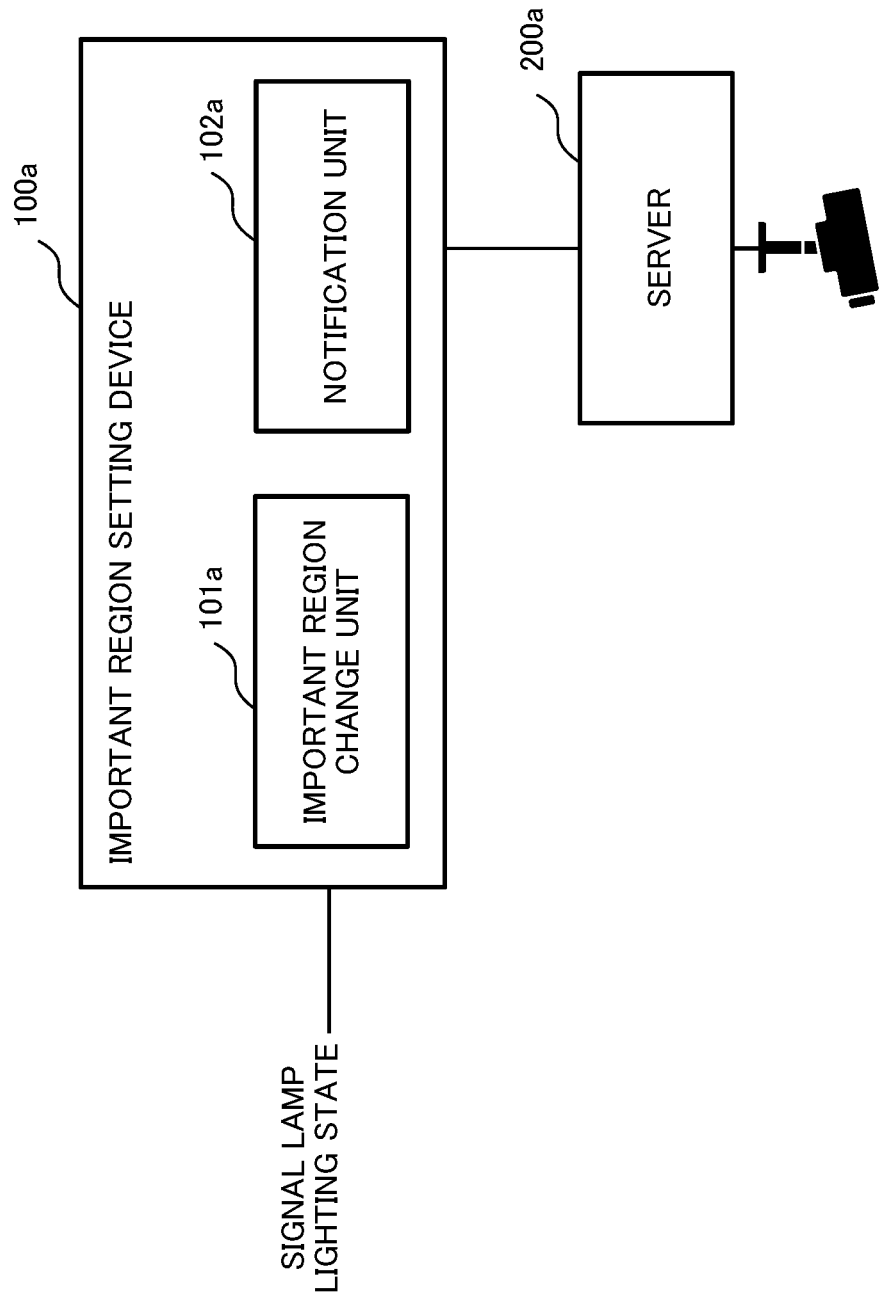
FIG. 1 is a diagram illustrating a configuration of an example embodiment of the present invention.

First, an outline of an example embodiment of the present invention will be described with reference to the drawings. The reference numerals in the drawings attached to this outline are attached to respective elements for convenience as an example for assisting understanding, and are not intended to limit the present invention to the illustrated aspects. Connection lines between blocks in the drawings and the like referred to in the following description include both bidirectional and unidirectional. The unidirectional arrow schematically indicates a flow of a main signal (data), and does not exclude bidirectionality. Although there are ports and interfaces at connection points of input to output of each block in the drawing, they are not illustrated. In the following description, "A and/or B" is used to mean at least any of A and B.

In the example embodiment, as illustrated in FIG. 1, the present invention can be achieved by an important region setting device 100a connected to a server 200a as a transmission source of the image captured by the camera installed on the road side or the like. The important region setting device 100a includes an important region change unit 101a and a notification unit 102a.

The important region change unit 101a functions as a means that changes the important region within the region that the predetermined camera is allowed to image according to the lighting state of the lamp of the predetermined traffic signal.

The notification unit 102a notifies the server 200a of the important region. In a case where the camera has a data transmission function such as a network camera, the server 200a can be omitted, and in this case, the notification unit 102a notifies the camera of the changed important region.

Figure 2:
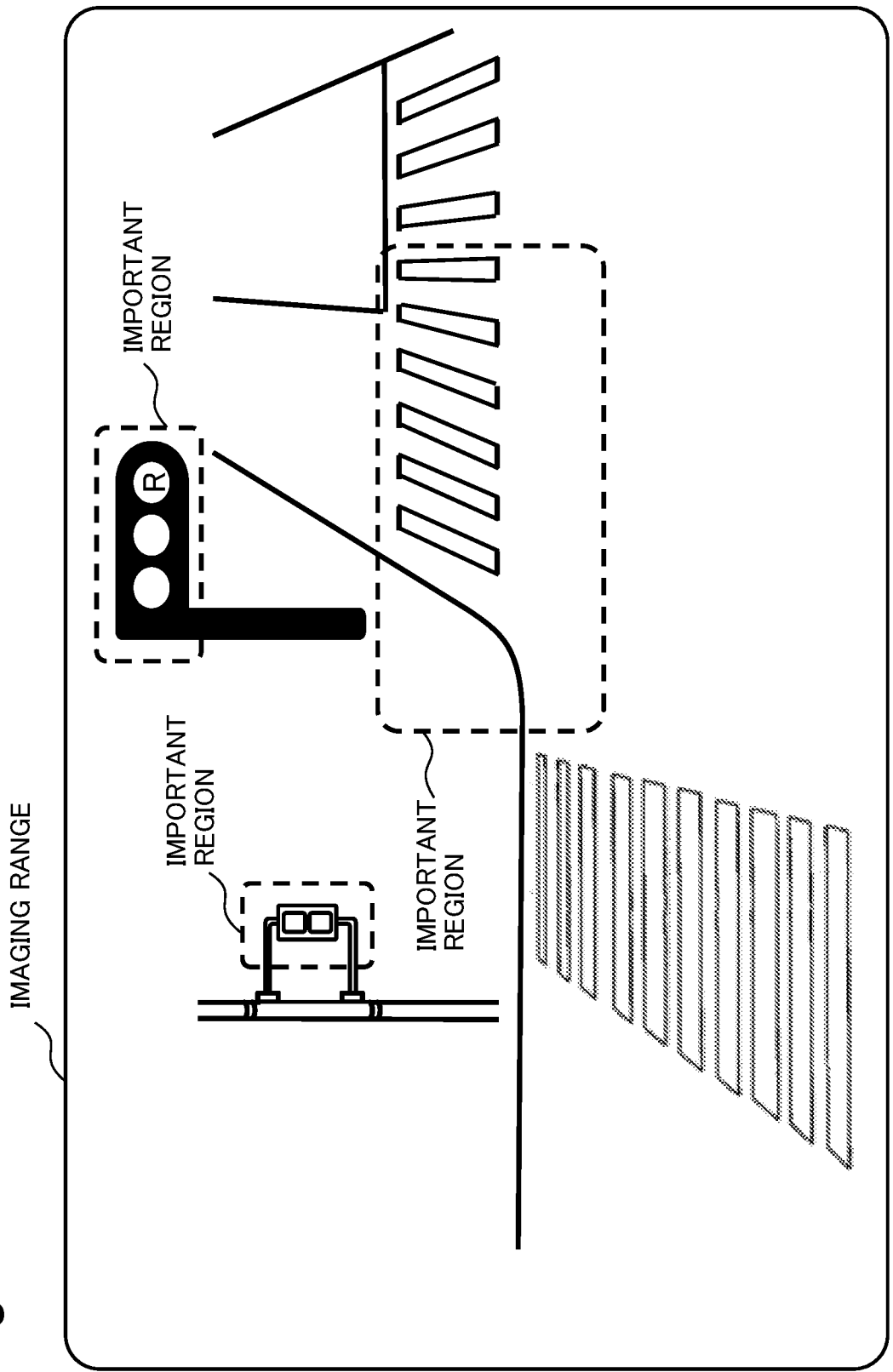
FIG. 2 is a diagram for explaining an operation of an example embodiment of the present invention.

FIG. 2 is a diagram illustrating a setting example of an important region in a state where a signal is red. Referring to FIG. 2, in the region that the camera is allowed to image, in addition to two regions in which the lamp of the signal appears, a region including the left lane side of the crosswalk in the front direction is set as the important region.

Figure 3:
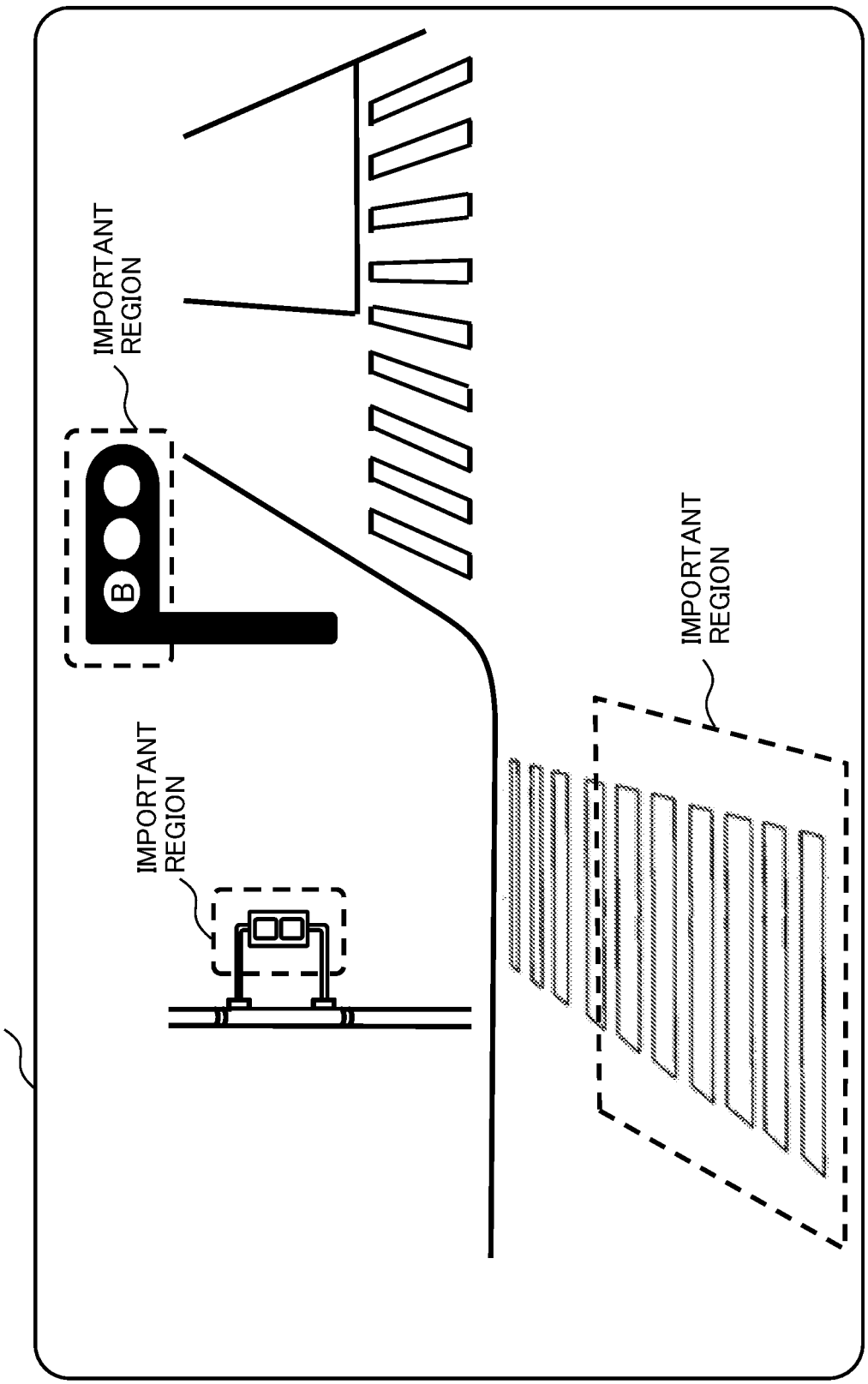
FIG. 3 is a diagram for explaining an operation of an example embodiment of the present invention.

From this state, for example, when the signal is switched from red to blue, the important region change unit 101a changes the important region as illustrated in FIG. 3. In the example of FIG. 3, there is no change in the region where the lamps of the signals appear, but the region including the crosswalk in the front direction is out of the important region, and the region including the left lane side of the crosswalk in the cross direction is set as the important region.

The notification unit 102a of the important region setting device 100a notifies the server 200a of the changed important region. The server 200a that has received the notification of the important region encodes the image using the notified important region. For example, as in PTLs 2 and 3, the server 200a encodes the important region with high image quality, and encodes the other regions with image quality lower than that of the important region. This makes it possible to efficiently compress data of an image captured by the camera. The use mode of the important region in the server 200a is not limited thereto. For example, only an important region may be cut out and sent to a traffic control center or the like as a transmission target, and other regions may be excluded from the transmission target. For example, processing of encoding an image captured by the camera in a state where a frame line indicating an important region is added to the image, processing of adding a frame line to image data as meta information, or the like may be performed.

Figure 4:
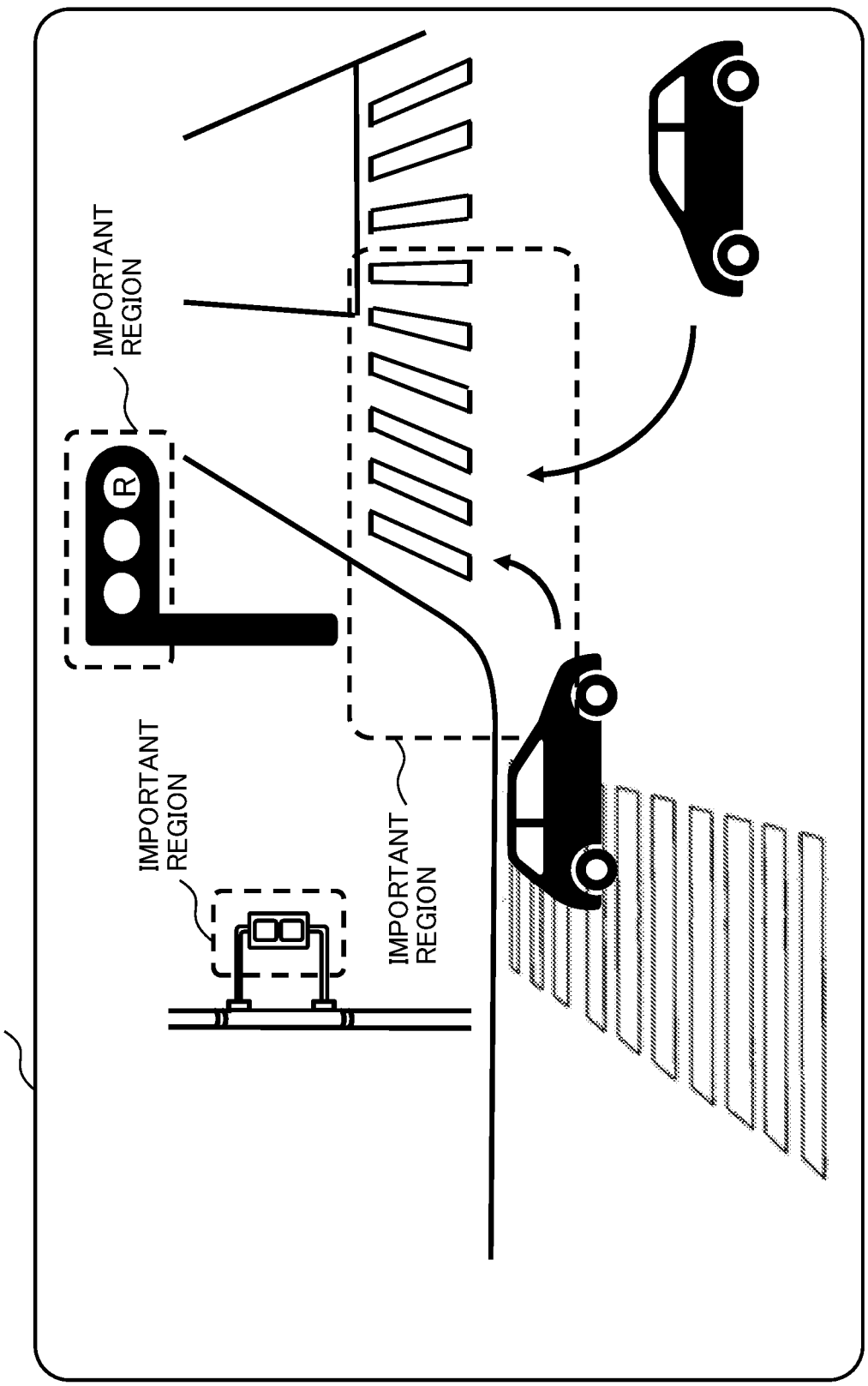
FIG. 4 is a diagram for explaining an operation of an example embodiment of the present invention.
Figure 5:
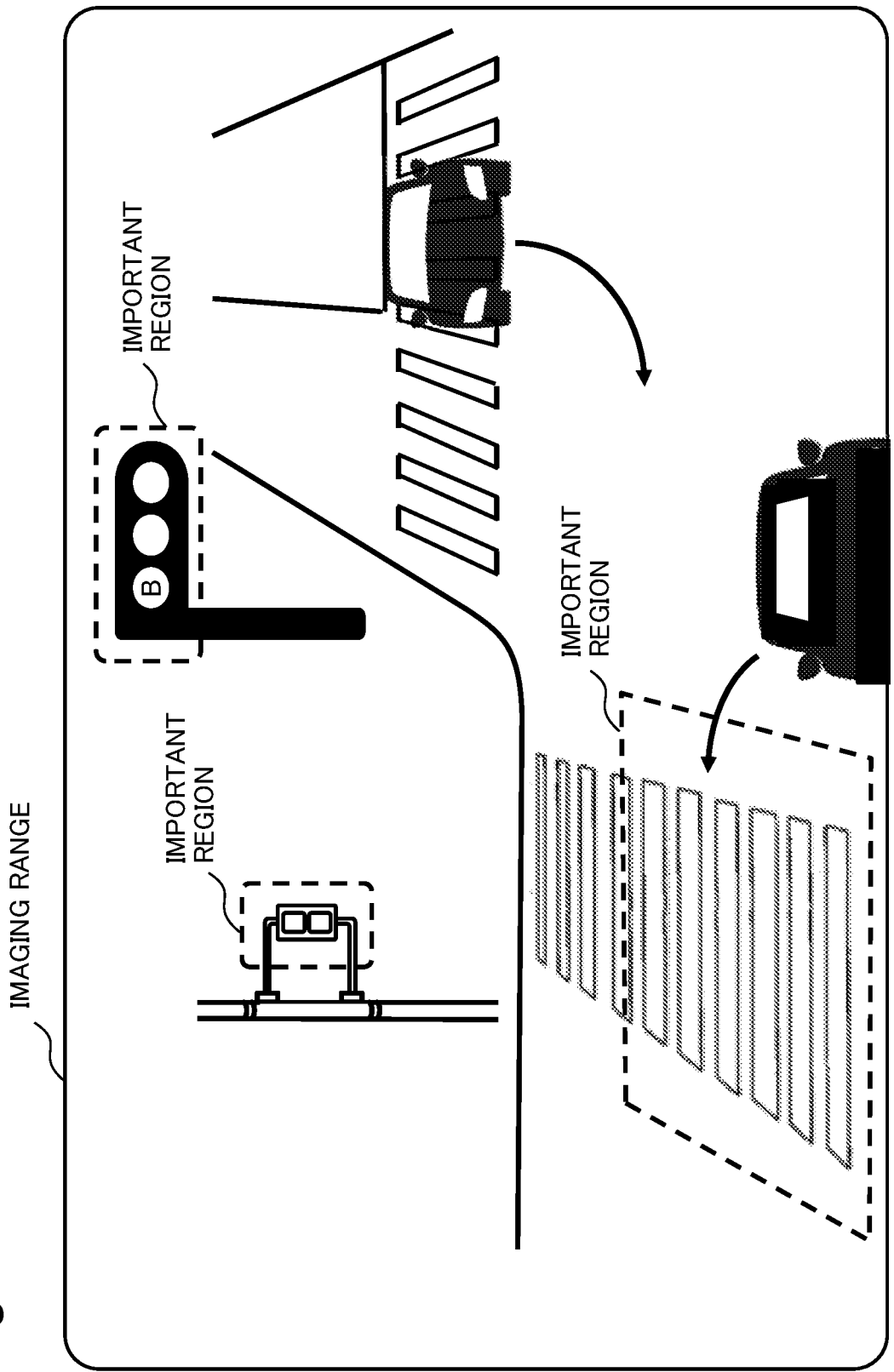
FIG. 5 is a diagram for explaining an operation of an example embodiment of the present invention.

In the important region set in this way, for example, in a case where the front signal is lit in red, as illustrated in FIG. 4, a portion of the crosswalk where the vehicle in the cross direction will turn right or left and cross can be recorded as the important region. On the other hand, since the vehicle and the pedestrian or the like basically do not intersect with each other, the other region is an unimportant region (excluding the portion where the signal is lit). Similarly, in a case where the front signal is lit in blue, as illustrated in FIG. 5, a portion of the crosswalk on the front side where the vehicle traveling in the same direction as the camera capturing direction the turns right or left and crosses can be recorded as the important region. On the other hand, since the vehicle and the pedestrian or the like basically do not intersect with each other, the other region is an unimportant region (excluding the portion where the signal is lit). By dynamically changing the important region of the image captured by the camera in this manner, it is possible to efficiently record a location where a traffic accident or a violation of a traffic rule is likely to occur.

First Example Embodiment

Figure 6:
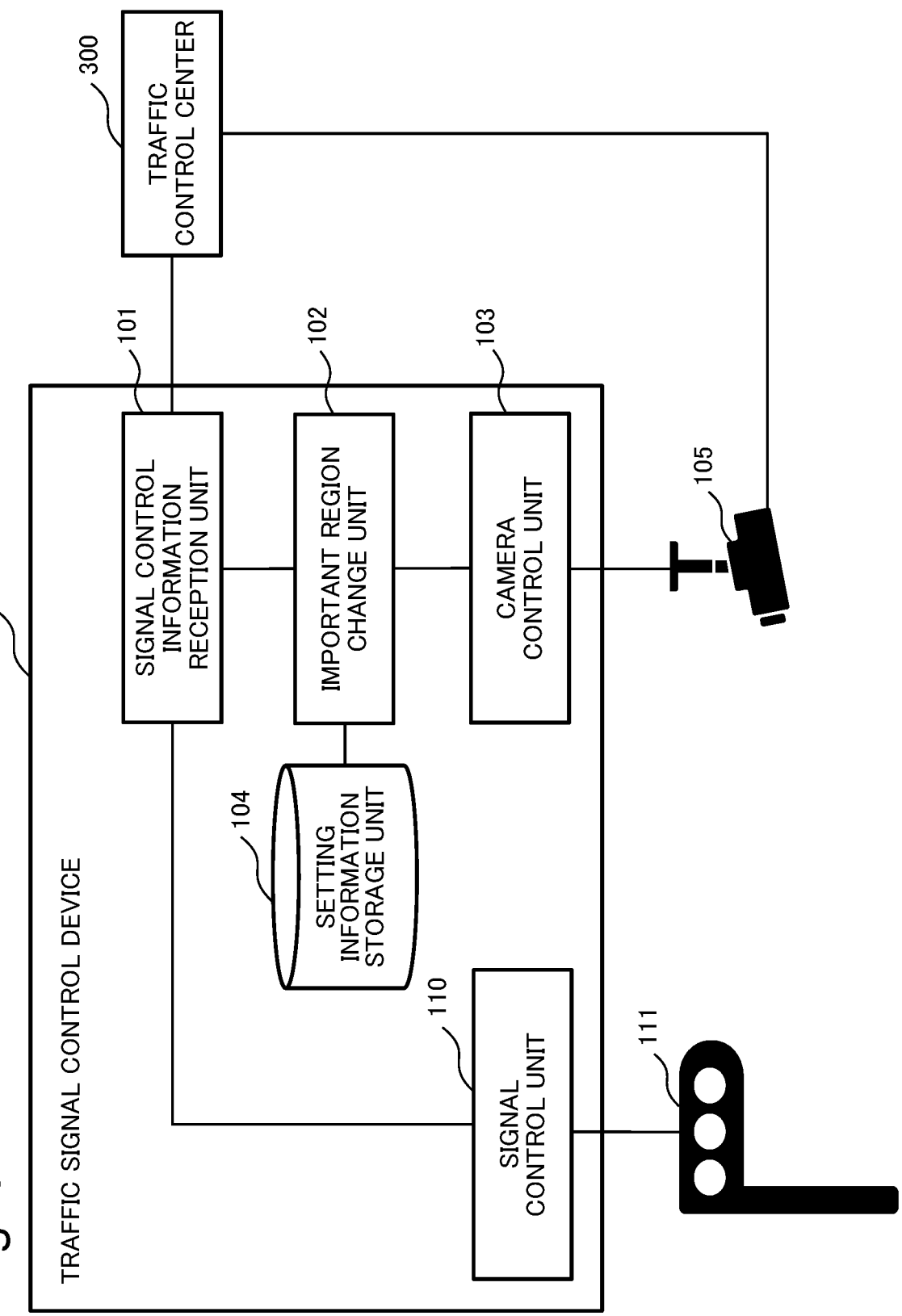
FIG. 6 is a diagram illustrating a system configuration according to the first example embodiment of the present invention.

Next, the first example embodiment of the present invention in which the function of the above-described important region setting device is added to the traffic signal control device will be described in detail with reference to the drawings. FIG. 6 is a diagram illustrating a system configuration according to the first example embodiment of the present invention. FIG. 6 indicates a traffic signal control device 100 connected to a camera 105, a traffic control center 300, and a traffic signal 111.

The traffic signal control device 100 includes a signal control information reception unit 101, an important region change unit 102, a camera control unit 103, a setting information storage unit 104, and a signal control unit 110.

The signal control information reception unit 101 receives the signal control information from the traffic control center 300, and transmits the received signal control information to the signal control unit 110 and the important region change unit 102.

The signal control unit 110 controls the traffic signal 111 based on the signal control information from the traffic control center 300 received via the signal control information reception unit 101. Such a traffic signal 111 is also referred to as a "centralized controller" in Japan. In a case where a pedestrian traffic light is provided at an intersection, the signal control unit 110 also controls the pedestrian traffic light. The functions corresponding to the signal control information reception unit 101 and the signal control unit 110 described above are equivalent to the functions included in the traffic signal control device installed at an intersection or the like. Therefore, the traffic signal control device 100 can also be achieved by adding the important region change unit 102, the camera control unit 103, and the setting information storage unit 104 to a traffic signal control device installed at an intersection or the like.

The important region change unit 102 changes the important region within the region that the camera 105 is allowed to image by based on the setting information read from the setting information storage unit 104 and the signal control information received from the traffic control center 300. Further, the important region change unit 102 notifies the camera control unit 103 of the changed important region.

Figure 8:
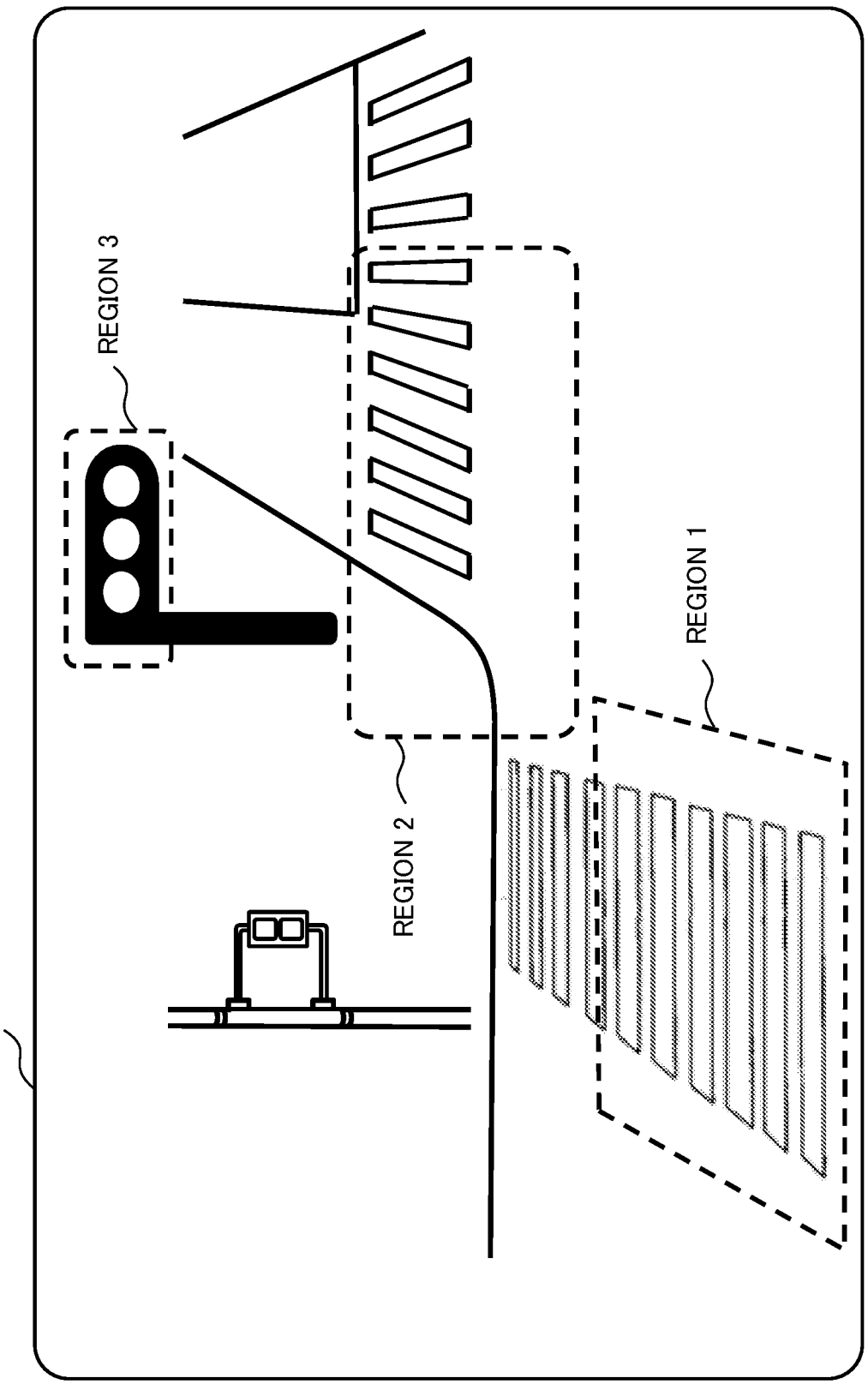
FIG. 8 is a diagram illustrating an example of an important region related to the setting information in FIG. 7.

The setting information storage unit 104 stores setting information for the important region change unit 102 to determine the important region based on the signal control information. FIG. 7 is a diagram illustrating an example of the setting information stored in the setting information storage unit 104. FIG. 7 illustrates an example of setting information in a form in which a step number to be stepped by the signal control information is associated with an important region. A remark column of FIG. 7 indicates the state of lighting of the signal lamp appearing in the camera 105. Among them, "all red" indicates a state in which the colors of all the lamps at the intersection are red. FIG. 8 is a diagram illustrating an example of regions 1 to 3 in FIG. 7. For example, in the case of the step number 1, the signal control unit 110 lights the vehicle signal and the pedestrian signal of FIG. 8 with blue light. At this time, the important region change unit 102 selects the region 1 and the region 3 as the important regions. As shown in FIG. 8, the region 1 is set at a location of a crosswalk traversed by a vehicle turning right or left at a green light. Although not illustrated in FIGS. 7 and 8, when the opposite crosswalk (the right side margin in FIG. 8) is included in the region that the camera 105 is allowed to image, a location traversed by a vehicle turning right or left in the crosswalk may also be set as the important region. The region set as the important region is not limited to the crosswalk, and one or more necessary portions can be appropriately set. For example, in addition to the location of the crosswalk in FIG. 8, the portion of the roadside strip can be set as the important region 4.

Thereafter, when the step moves forward and the step number is 4, the signal control unit 110 changes the vehicle signal of FIG. 8 to yellow light. At this time, the important region change unit 102 selects the region 1, the region 2, and the region 3 as the important regions. Further, when the step moves forward by one and is the step number is 5, the signal control unit 110 changes the vehicle signal of FIG. 8 to red light. At this time, the important region change unit 102 selects the region 2 and the region 3 as the important regions. Thereafter, between the step number 6 and the step number N−1, the selection of the region 2 and the region 3 is maintained as the important region (the signal on the cross side changes). Further, thereafter, when the step number is N, the step number returns to 1 through the all-red state in which all vehicle signals and pedestrian signals at the intersection are red. Here, as illustrated in FIG. 8, the region 2 is set at a location of a crosswalk traversed by a vehicle turning right or left from a road in a cross direction at a red light. In the example of FIG. 7, the region 3 is set as a fixed important region regardless of a change in the step. In the example of FIG. 8, the region 3 is set at a portion where a lamp of a traffic signal appears. Although not illustrated in FIGS. 7 and 8, the portion of the lamp of the pedestrian signal can also be set as the important region.

The camera control unit 103 notifies the camera of the important region selected by the important region change unit 102, and causes the camera 105 to perform a process using the important region. Examples of the process using the important region include an encoding process for encoding a partial region of an image with high image quality described in PTLs 2 and 3, and various methods capable of recording two regions with different image quality. As a result, the amount of data transfer between the camera 105 and the traffic control center 300 and the storage capacity of data in the traffic control center 300 can be suppressed. Another process using the important region can include a process of overlaying a frame line indicating the important region on an image captured by the camera 105 or adding the frame line as meta information.

The traffic control center 300 transmits signal control information to the traffic signal control device 100 to control the traffic signal 111. The traffic control center 300 collects images captured by the camera 105 and grasps occurrence of traffic congestion and traffic accidents. At this time, since the above-described important region is set in the image captured by the camera 105, the traffic control center 300 can perform necessary monitoring and investigation without delay.

The camera 105 is, for example, a camera installed at a traffic signal or in the vicinity thereof in such a way as to obtain the in-intersection image illustrated in FIG. 8. The camera 105 has functions of encoding an image, adding a frame line or the like indicating a region in the image, adding meta information, or the like, using the important region notified by the camera control unit 103. In the present specification, "encoding of an image" also includes encoding of a moving image.

Figure 9:
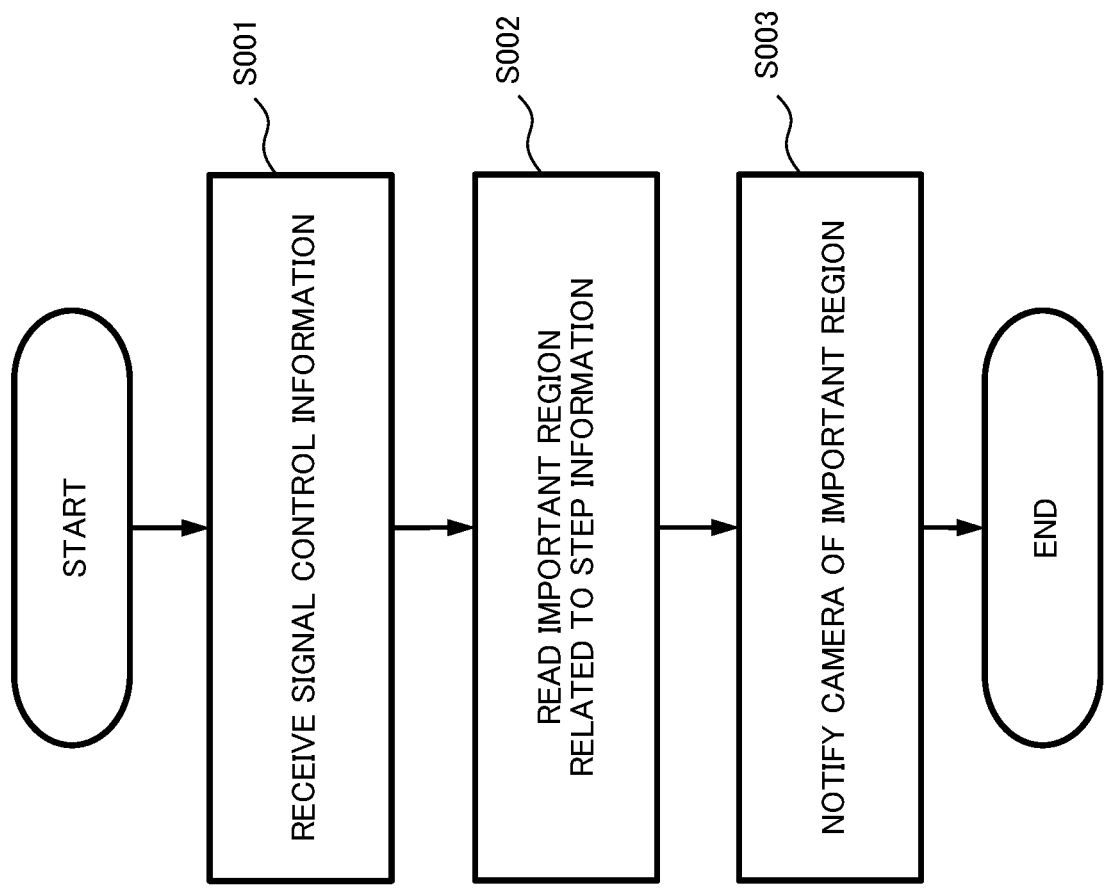
FIG. 9 is a flowchart illustrating an operation of a traffic signal control device according to the first example embodiment of the present invention.

Next, the operation of the present example embodiment will be described in detail with reference to the drawings. FIG. 9 is a flowchart illustrating an operation of the traffic signal control device according to the first example embodiment of the present invention. Referring to FIG. 9, first, the traffic signal control device 100 receives the signal control information from the traffic control center 300 (step S001).

Upon receiving the signal control information, the traffic signal control device 100 updates the step number and controls the traffic signal 111. Further, the traffic signal control device 100 reads the important region related to the updated step number from the setting information (step S002).

Next, the traffic signal control device 100 notifies the camera 105 of the read important region (step S003).

By the above operation, the traffic signal control device 100 changes the important region according to the state of lighting of the traffic signal and notifies the camera 105 of the changed important region. As a result, the camera 105 that captures the image in the intersection can be caused to perform various processes using the important region. For example, by encoding an image such that the portion of the important region has higher image quality than the other portions (see PTLs 2 and 3), it is possible to reduce the load of the network, save the storage, and efficiently use these resources. Furthermore, for example, by adding marking and meta information to an image using a important region, it is also possible to improve efficiency of monitoring an intersection in the traffic control center 300.

In the first example embodiment described above, the example of FIGS. 7 and 8 is illustrated and the description is made in which the important region is set according to the step number, but the traffic signal control device 100 may set the important region according to the color of lighting grasped from the signal control information instead of the step number.

In the first example embodiment described above, the description is made in which the important region is changed according to the step of the step number, but the step may be further subdivided by time, and the traffic signal control device 100 may set the important region for each time zone in the subdivided step.

Further, in the setting information of FIG. 7 described above, the important region is set for each combination of the vehicle signal and the pedestrian signal, but setting information for changing the important region according to a change in one of the vehicle signal and the pedestrian signal can also be used. When a signal other than the vehicle signal and the pedestrian signal is present at an intersection or the like, it is also possible to use setting information for changing the important region for each combination with the signal other them.

Second Example Embodiment

In the first example embodiment described above, an example in which the traffic signal 111 is directly controlled by the traffic control center 300 is described, but the present invention can also be applied to, for example, a traffic signal called a fixed cycle control signal that is not directly controlled by the traffic control center 300. Hereinafter, the second example embodiment in which an important region is changed according to lighting of a traffic signal which is not directly controlled by the traffic control center 300 will be described.

Figure 10:
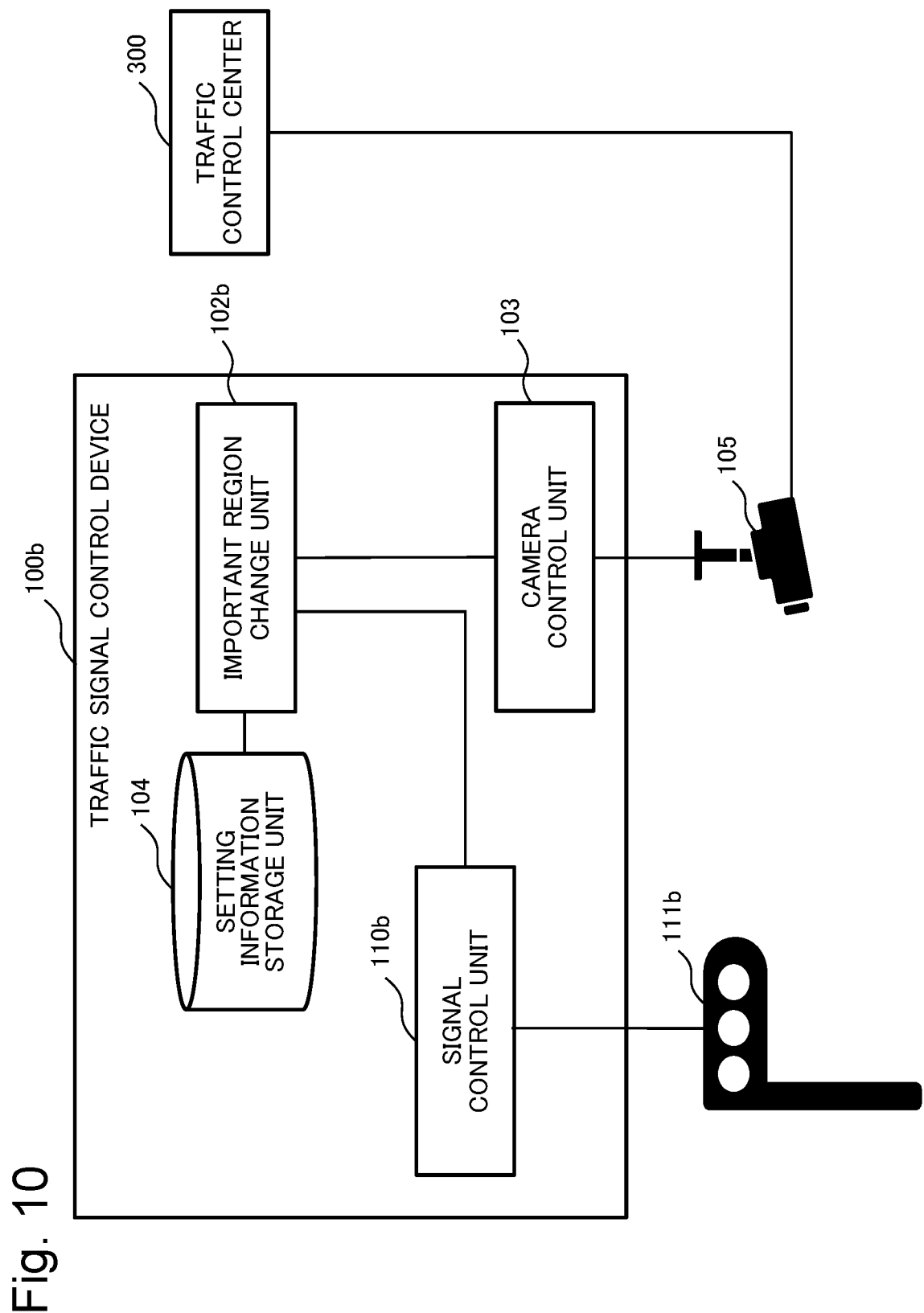
FIG. 10 is a diagram illustrating a system configuration according to the second example embodiment of the present invention.

FIG. 10 is a diagram illustrating a system configuration according to the second example embodiment of the present invention. A major difference in configuration from the first example embodiment illustrated in FIG. 6 is that a traffic signal control device 100b controls a traffic signal 111b without being controlled by the traffic control center 300. Since the other configurations are similar to those of the first example embodiment, differences thereof will be mainly described below.

A signal control unit 110b controls the traffic signal 111b in such a way as to perform a lighting pattern (also referred to as an aspect configuration) at a preset cycle. The signal control unit 110b may be connected to a sensor (detector) (not illustrated) to perform sensitive control of changing a lighting pattern according to the presence or absence of a vehicle or a pedestrian. The control content from the signal control unit 110b is also supplied to the important region change unit 102b.

An important region change unit 102b changes the important region within the region that the camera 105 is allowed to image based on the setting information read from the setting information storage unit 104 and the signal control information supplied from the signal control unit 110b. For example, as in the first example embodiment, the important region change unit 102b changes the important region by reading the important region related to the step number to be stepped by the signal control information from the setting information.

Other operations are the same as those of the first example embodiment, and thus description thereof is omitted. As described above, according to the configuration of the present example embodiment, it is possible to notify the camera 105 that images an intersection or the like where the traffic signal 111b not controlled by the traffic control center 300 is installed of the important region to cause the camera 105 to perform various processes using the important region.

Third Example Embodiment

In the first and second example embodiments described above, the description is made in which the traffic signal control device is connected to the camera 105 to make notification of the important region, but it is assumed that the traffic signal control device and the control device of the camera are configured by different devices. In this case, it is assumed that the camera control device cannot receive the signal control information from the traffic signal control device. Hereinafter, the third example embodiment assuming a case where the traffic signal control device and the camera control device are configured by different devices will be described.

Figure 11:
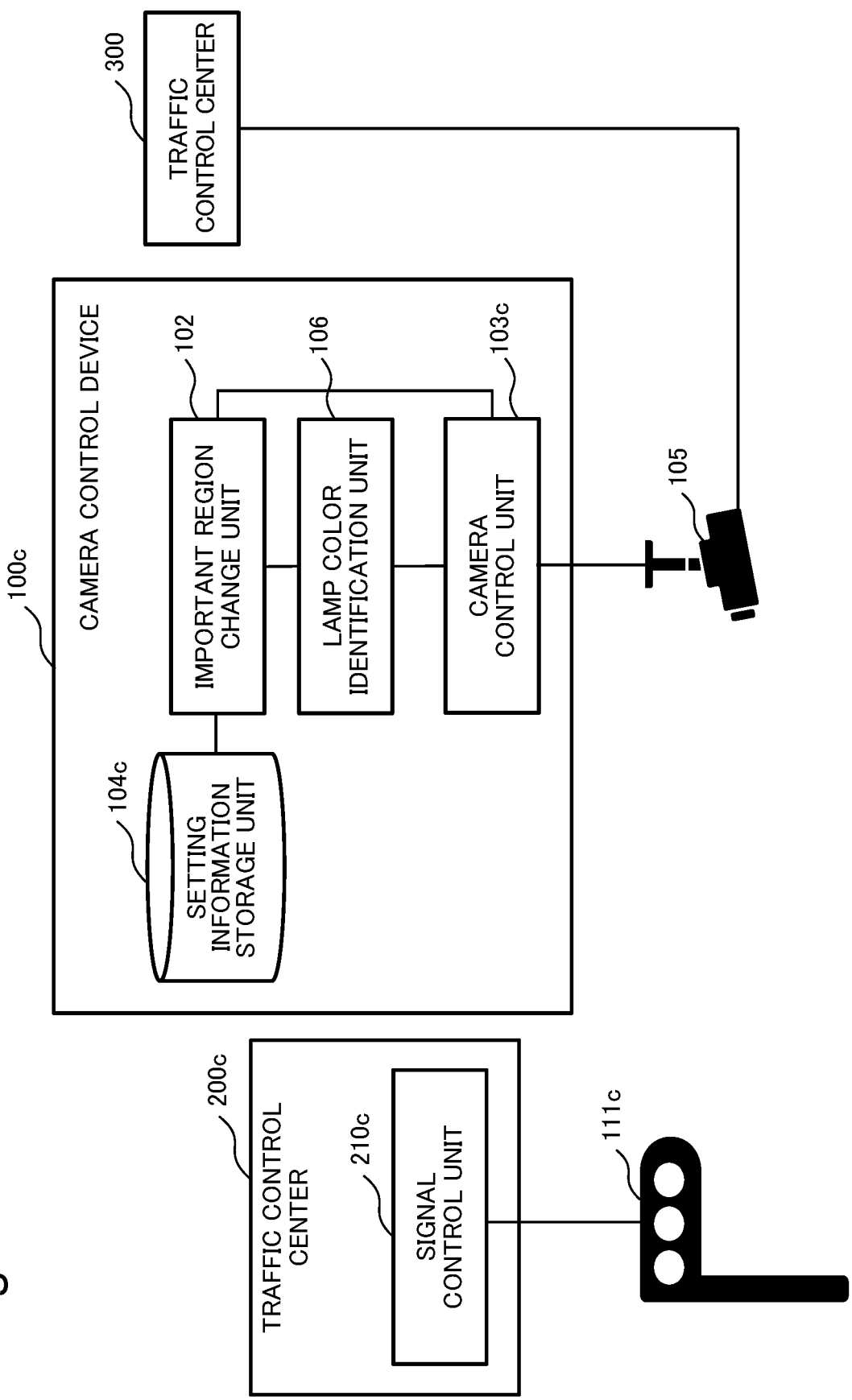
FIG. 11 is a diagram illustrating a system configuration according to the third example embodiment of the present invention.

FIG. 11 is a diagram illustrating a system configuration according to the third example embodiment of the present invention. A major difference from the configuration of the second example embodiment illustrated in FIG. 10 is that a traffic signal control device 200c and a camera control device 100c are configured as separate independent devices. Therefore, the camera control device 100c includes a lamp color identification unit 106 for grasping the lighting state of the lamp of the traffic signal instead of the signal control information. A setting information storage unit 104c stores setting information for changing the important region regardless of the signal control information. Since the other configurations are similar to those of the first and second example embodiments, the differences thereof will be mainly described below.

The traffic signal control device 200c is a device that includes a signal control unit 210c and controls a traffic signal 111c without being controlled by the traffic control center 300. The signal control unit 210c is similar to the signal control unit 110b of the second example embodiment, and controls the traffic signal 111c in such a way as to perform a lighting pattern (also referred to as an aspect configuration) at a preset cycle.

The camera control device 100c includes the important region change unit 102, the lamp color identification unit 106, the camera control unit 103c, and the setting information storage unit 104c.

In addition to the control of the camera 105, the camera control unit 103c can provide an image captured by the camera 105 to the lamp color identification unit 106.

The lamp color identification unit 106 identifies the lighting state of the lamp of the traffic signal 111c from the image of the traffic signal 111c appearing in the image supplied from the camera control unit 103c, and transmits the result to the important region change unit 102. Therefore, the lamp color identification unit 106 functions as a means configured to identify the lighting state of the lamp of the traffic signal from the image captured by the camera 105.

The setting information storage unit 104c stores setting information for changing the important region regardless of the signal control information. FIG. 12 is a diagram illustrating an example of the setting information held in the setting information storage unit 104c according to the present example embodiment. In the example of FIG. 12, an example of the setting information in which the lighting pattern of the lamp as the change condition of the important region is associated with the important region to be selected is illustrated.

The important region change unit 102 refers to the setting information held in the setting information storage unit 104c, selects an important region adapted to the lighting state of the lamp received from the lamp color identification unit 106, and notifies the camera control unit 103c of the selected important region. For example, when both the vehicle signal and the pedestrian signal are blue, the important region change unit 102 selects the region 1 and the region 3 as the important regions.

Thereafter, when the lighting color of the traffic signal changes, the vehicle signal turns yellow, and the pedestrian signal turns red, the important region change unit 102 selects the region 1, the region 2, and the region 3 as the important regions. Further, the important region change unit 102 selects the region 2 and the region 3 as the important regions at the timing when the lighting color of the traffic signal changes and three seconds have elapsed since both the vehicle signal and the pedestrian signal turned red.

As described above, even when the control content of the traffic signal control device 200c for the traffic signal 111c cannot be acquired in real time, according to the configuration of the present example embodiment, it is possible to select the important region according to the lighting state of the lamp of the traffic signal as in the first and second example embodiments. In other words, according to the present example embodiment, the important region can be appropriately changed as in the first and second example embodiments at the timing when the combination of the lamps of the traffic signal 111c is the predetermined lighting state. In the third example embodiment, the description is made in which the traffic signal 111c is not directly controlled by the traffic control center 300, but the traffic signal 111c may be directly controlled by the traffic control center 300. In this case, a control line is added between the traffic control center 300 and the traffic signal control device 200c in FIG. 11.

The camera control device described above can be integrated with a camera. Such a camera can also be grasped as a network camera including the camera unit 105, the important region change unit 102, the lamp color identification unit 106, the camera control unit 103c, and the setting information storage unit 104c in FIG. 11. In the configuration as described above, as in the first example embodiment, in a case where the network camera can acquire the signal control information from the traffic control center 300, the lamp color identification unit 106 can be replaced with a signal control information reception unit.

Fourth Example Embodiment

In the first to third example embodiments described above, the description is made in which the traffic signal control device or the camera control device transmits the important region to the camera, and the camera performs encoding or the like, but the traffic signal control device can perform encoding or the like. Next, the fourth example embodiment in which the encoding function is disposed in the traffic signal control device will be described in detail with reference to the drawing.

Figure 13:
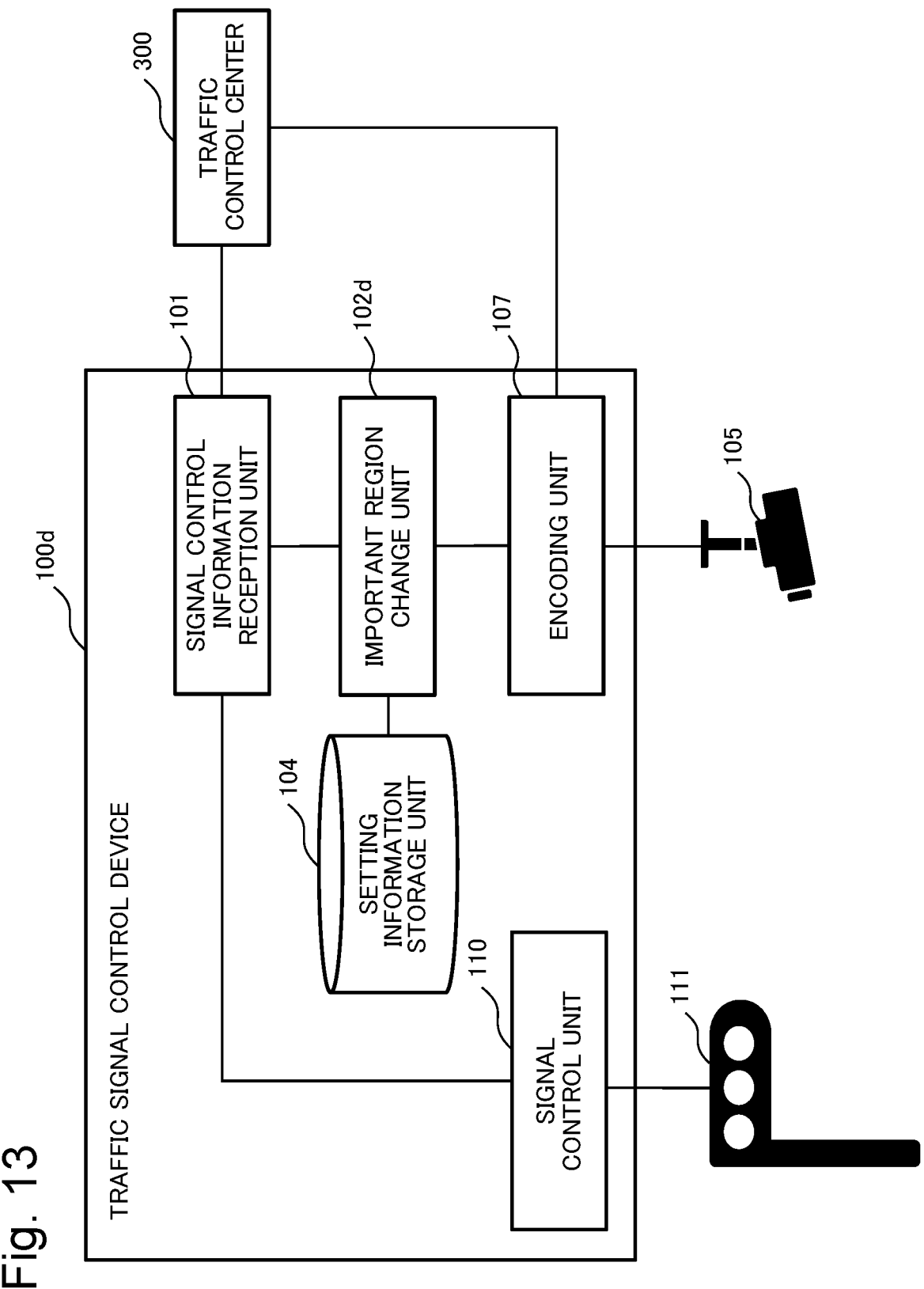
FIG. 13 is a diagram illustrating a system configuration according to the fourth example embodiment of the present invention.

FIG. 13 is a diagram illustrating a system configuration according to the fourth example embodiment of the present invention. A major difference in configuration from the first example embodiment illustrated in FIG. 6 is that an encoding unit 107 instead of the camera control unit 103 is provided in a traffic signal control device 100d, and the traffic signal control device 100d is configured to be able to transmit data encoded to the traffic control center 300. Since the other configurations are similar to those of the first example embodiment, the differences thereof will be mainly described below.

As in the first example embodiment, an important region change unit 102d changes the important region within the region that the camera 105 is allowed to image based on the setting information read from the setting information storage unit 104 and the signal control information received from the traffic control center 300, and notifies the encoding unit 107 of the changed important region.

The encoding unit 107 performs encoding on the data output from the camera 105 after performing encoding using an important region, addition of a frame line or the like indicating a region in an image, addition of meta information, and the like. Examples of the encoding using the important region include encoding methods described in PTLs 2 and 3 in which image quality of a specific region is higher (lower compression) than image quality of other regions. Such an encoding unit 107 can be achieved not only by a program (software) operating on a computer but also by hardware such as a field-programmable gate array (FPGA).

The encoding unit 107 transmits the encoded data to the traffic control center 300. As a result, as in the first example embodiment, it is possible to reduce the load of the network, save the storage, and efficiently use these resources. Furthermore, for example, by adding marking and meta information to an image using a important region, it is also possible to improve efficiency of monitoring an intersection in the traffic control center 300.

Figure 14:
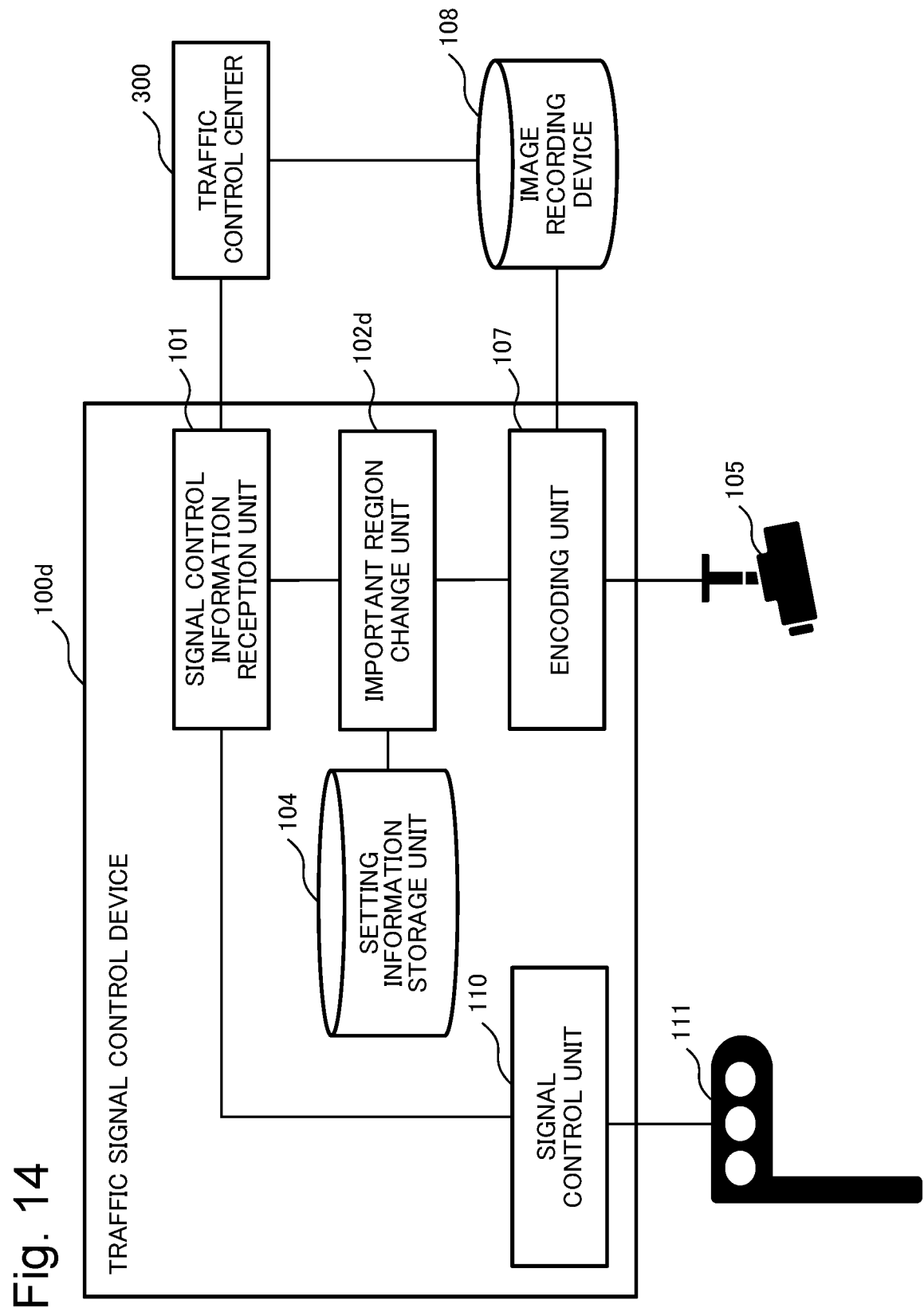
FIG. 14 is a view illustrating a modification of the fourth example embodiment of the present invention.

In the example of FIG. 13, the traffic signal control device 100d transmits the encoded data to the traffic control center 300. As illustrated in FIG. 14, it is also possible to adopt a mode in which the traffic signal control device 100d temporarily records the encoded data in an image recording device 108 disposed on the network. In this case, the traffic control center 300 accesses the image recording device 108 and refers to necessary data.

Figure 15:
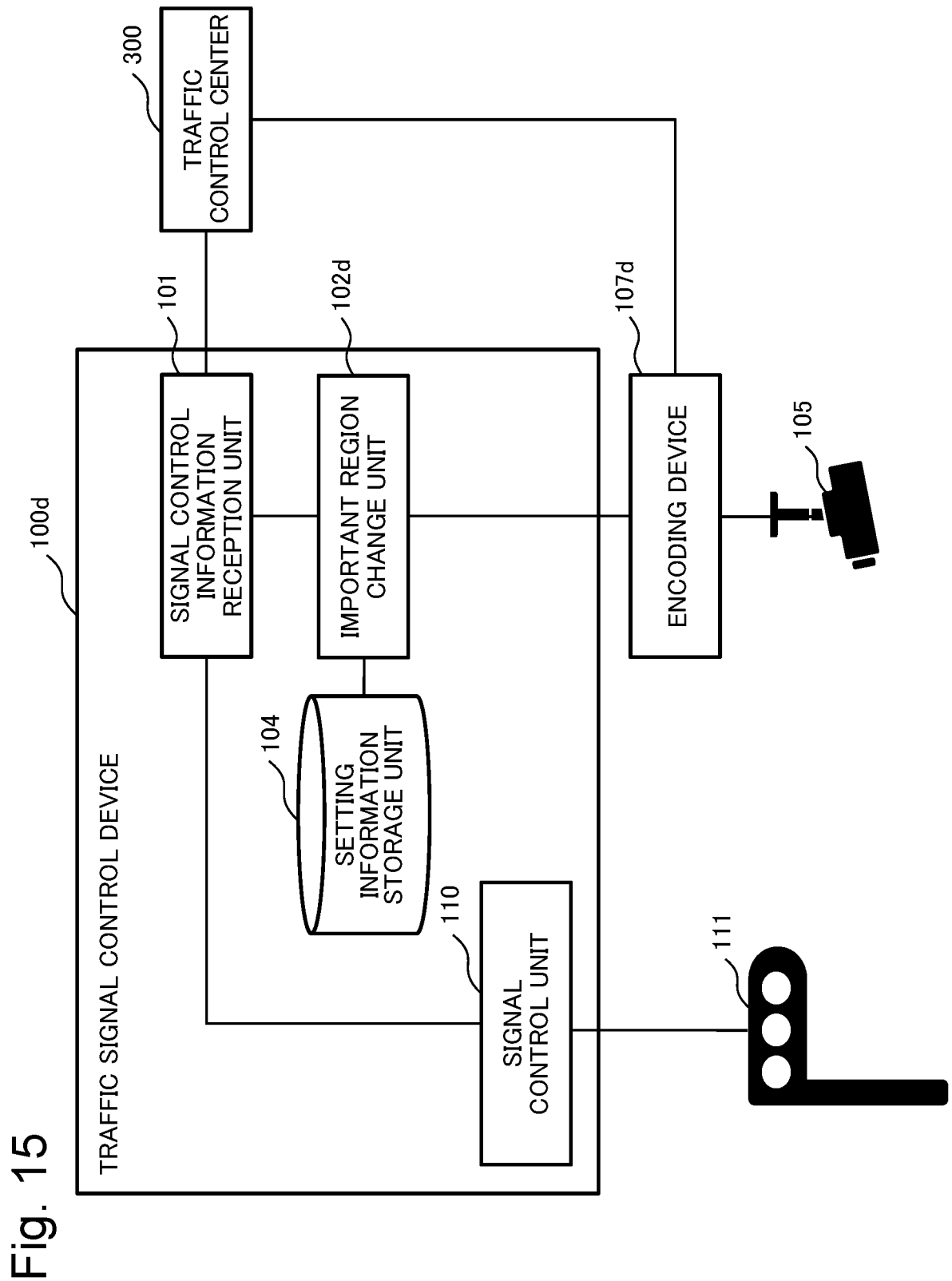
FIG. 15 is a view illustrating a modification of the fourth example embodiment of the present invention.
Figure 16:
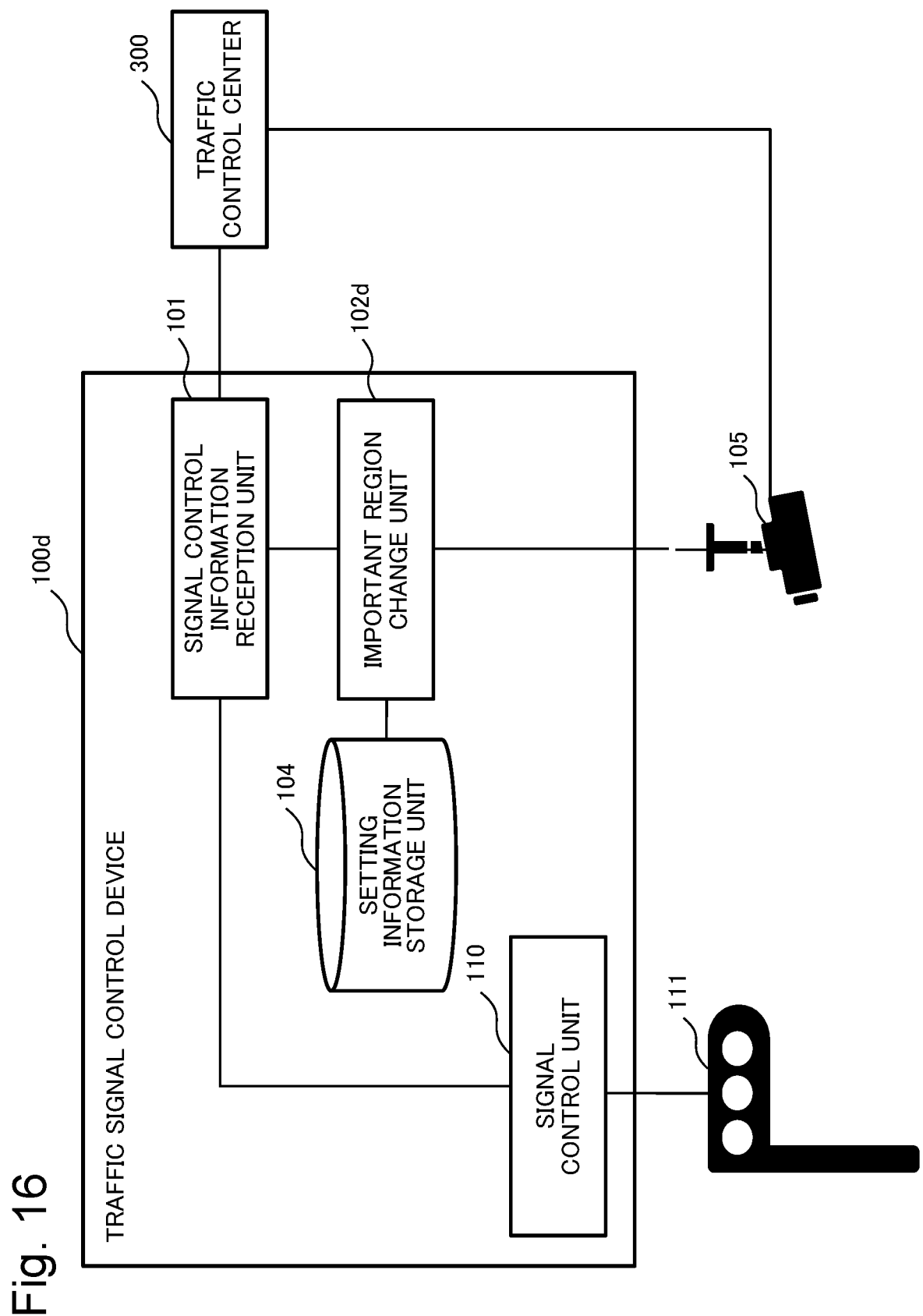
FIG. 16 is a view illustrating a modification of the fourth example embodiment of the present invention.

The encoding unit illustrated in FIG. 13 may be configured as a device different from the traffic signal control device (the important region setting device) (see FIG. 15). Such an encoding device 107d is recognized as an encoding device that encodes a moving image captured by a camera using the important region notified by the traffic signal control device 100d. Such an encoding device can also be implemented as a mobile edge computing (MEC) server connected to a camera. By providing such a MEC server, it is possible to reduce a processing load in the traffic signal control device (important region setting device). As illustrated in FIG. 16, the encoding unit may be disposed in the camera 105. In this case, the amount of data flowing between the camera 105 and the traffic control center 300 can be reduced.

Figure 17:
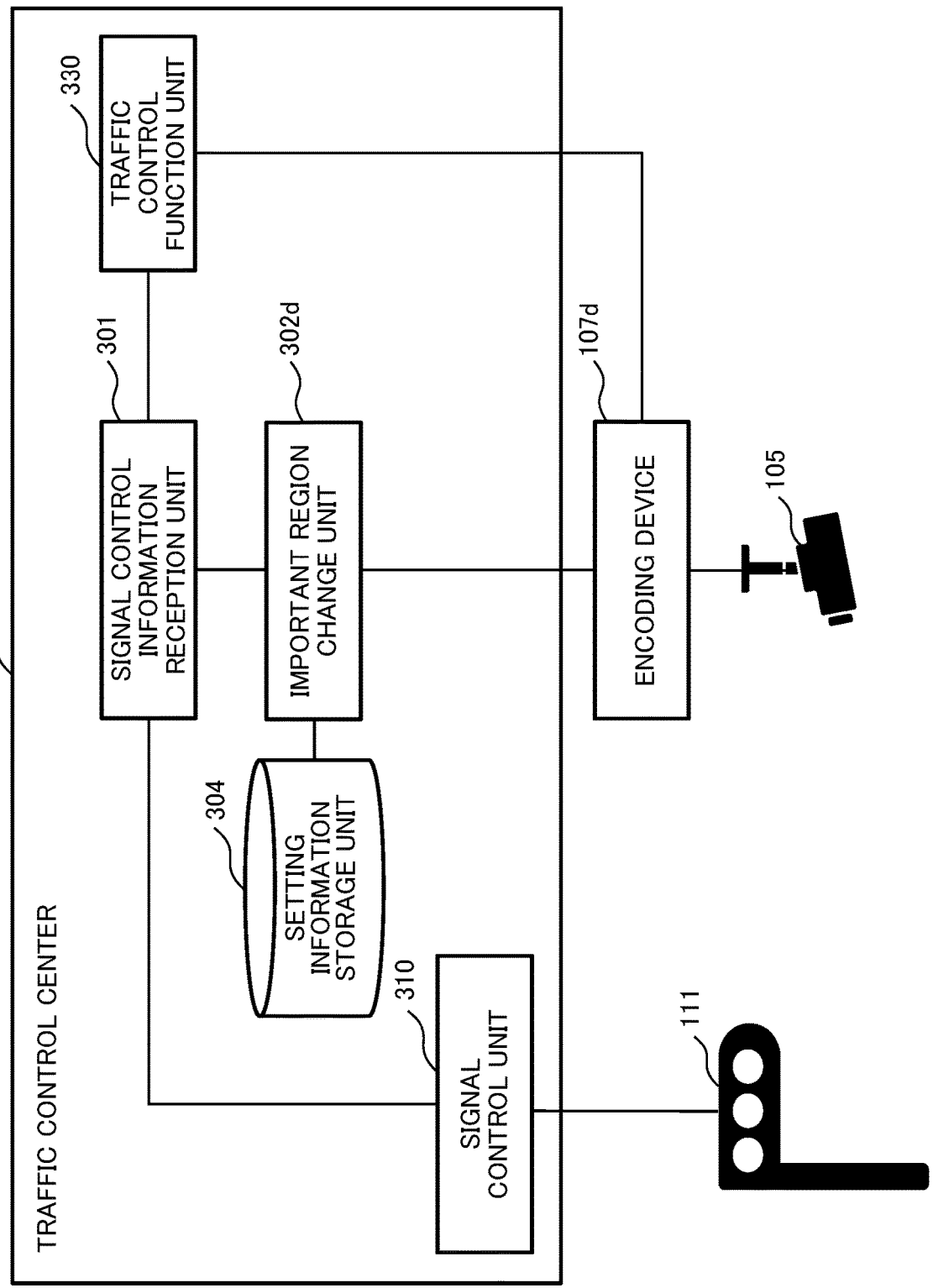
FIG. 17 is a view illustrating a modification of the fourth example embodiment of the present invention.

A function equivalent to the above-described traffic control device can be provided in the traffic control center (see FIG. 17). FIG. 17 illustrates a configuration including a traffic control function unit 330, a signal control information reception unit 301, an important region change unit 302d, a setting information storage unit 304, and a signal control unit 310. The traffic control function unit 330 corresponds to the function of the traffic control center 300 in FIG. 15. The signal control information reception unit 301, the important region change unit 302d, the setting information storage unit 304, and the signal control unit 310 correspond to the signal control information reception unit 101, the important region change unit 102d, the setting information storage unit 104, and the signal control unit 110 in FIG. 15, respectively. As described above, the present invention can be achieved in the traffic control center 300a that controls the encoding device 107d. In the form of FIG. 17, as in FIG. 14, a configuration in which an image recording device is provided between the encoding device 107d and the traffic control function unit 330 can also be used.

Although the example embodiments of the present invention have been described above, the present invention is not limited to the above-described example embodiments, and further modifications, substitutions, and adjustments can be made without departing from the basic technical idea of the present invention. For example, the device configuration, the configuration of respective elements, and the expression form of data and the like illustrated in the drawings are examples for assisting the understanding of the present invention, and are not limited to the configurations illustrated in the drawings. For example, in the first to fourth example embodiments described above, the description is made in which the camera 105 captures an image in the intersection, but the position of the camera 105 is not limited thereto. For example, even in a camera located away from a traffic signal, it may be better to change the important region according to the state of lighting of the traffic signal. For example, there is a case where a camera is installed at a crosswalk located away from a traffic signal, a store facing a road, or a parking lot. The present invention can also be applied to the notification of the important region to these cameras.

The camera described in the above example embodiment may be a camera (traffic flow measuring camera, signal camera) constituting a so-called traffic infrastructure installed in a lamp housing of a traffic signal or attached to the housing as in PTL 1. An embodiment in which data captured by the camera is transmitted to the traffic control center 300 via the nearest base station can also be used. The base station may be a base station of a long term evolution (LTE) or a fifth generation mobile communication system (5G). Furthermore, these base stations may have functions as the important region setting device and the camera control device of the present invention.

In the above-described example embodiment, an example of changing the important region using the setting information is described. The traffic signal control device (important region setting device) can change and set the important region from another aspect. For example, the traffic signal control device (important region setting device) may change the size or increase the position of the important region based on the day of the week, the time zone, or the like. In this way, it is possible to appropriately perform monitoring in a time when there are many accidents and in a commuting time.

The description is made in which the image captured by the camera 105 and subjected to encoding or the like using the important region is transmitted to the traffic control center 300, but the image may be transmitted to another entity. For example, an image or the like subjected to encoding or the like using the important region may be transmitted to a data management system (business operator) that collects, analyzes, and provides traffic-related data. An image or the like subjected to encoding or the like using the important region may be directly transmitted to another transportation infrastructure or vehicle.

Figure 18:
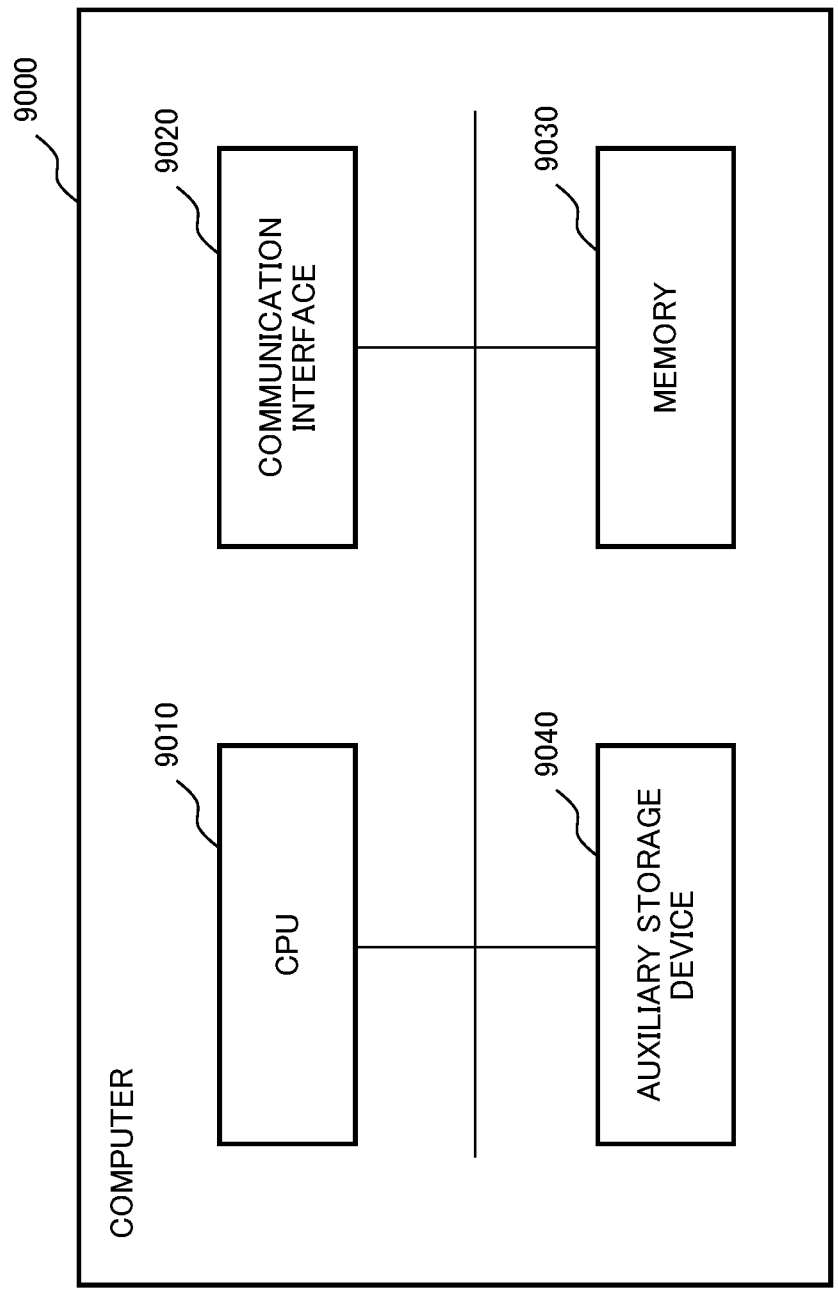
FIG. 18 is a diagram illustrating a configuration of a computer that can function as a control device of the present invention.

The procedure described in each of the above example embodiments can be achieved by a program for causing a computer (9000 in FIG. 18) that functions as the important region setting device and the traffic signal control device to implement functions as these devices. Such a computer is exemplified in a configuration including a central processing unit (CPU) 9010, a communication interface 9020, a memory 9030, and an auxiliary storage device 9040 in FIG. 18. That is, the CPU 9010 of FIG. 18 may execute the important region change program and the important region notification program.

That is, each unit (processing means and function) of the above-described important region setting device and traffic signal control device can be achieved by a computer program that causes a processor mounted on these devices to execute each of the above-described processes using the hardware.

Some or all of the above example embodiments may be described as the following Supplementary Notes, but are not limited to the following.

[Supplementary Note 1]
(See the important region setting device from the first aspect)

[Supplementary Note 2]
The important region setting device may be configured to change the important region by using the step information indicating a lighting state of a lamp of the traffic signal.

[Supplementary Note 3]
The important region setting device may be configured to change the important region at a predetermined timing based on a change in a lighting state of a lamp of the traffic signal.

[Supplementary Note 4]
The camera is disposed at a position where the camera is allowed to image a lamp of the traffic signal, and the important region setting device may further include a means configured to identify a lighting state of a lamp of the traffic signal from an image captured by the camera.

[Supplementary Note 5]

The important region setting device may be configured to make notification of, as the important region, region information for encoding the image quality of the important region with image quality different from image quality of the region other than the important region.

[Supplementary Note 6]

The important region setting device may be configured to switch the important region with reference to setting information in which a region including a crosswalk traversed by a vehicle turning right or left at an intersection is set.

[Supplementary Note 7]

The camera in which the important region setting device sets the important region may be a camera installed on the road side.

[Supplementary Note 8]

(See the encoding device from the second aspect)

[Supplementary Note 9]

(See the network camera from the third aspect)

[Supplementary Note 10]

(See the method of setting the important region from the fourth aspect)

[Supplementary Note 11]

(See the program from the fifth aspect)

As in the first embodiment, the ninth to eleventh embodiments can be developed into the second to seventh embodiments.

The disclosure of the above PTLs is incorporated herein by reference. Within the frame of the entire disclosure (including the claims) of the present invention, it is possible to change and adjust the example embodiments or examples further based on of the basic technical idea thereof. Various combinations or selections (including partial deletions) of various disclosure elements (respective elements of each claim, respective elements of each example embodiment or example, respective elements of each drawing, and the like are included) can be made within the frame of the disclosure of the present invention. That is, it goes without saying that the present invention includes various modifications and corrections that can be made by those of ordinary skill in the art in accordance with the entire disclosure including the claims and the technical idea. Specifically, for numerical ranges set forth herein, any numerical value or sub-range included within the range should be construed as being specifically described, even when not stated otherwise.

REFERENCE SIGNS LIST 100a important region setting device
100, 100b, 100d, 200c traffic signal control device
100c camera control device
101, 301 signal control information reception unit
101a, 102, 102b, 102d, 302d important region change unit
102a notification unit
103, 103c camera control unit
104, 104c, 304 setting information storage unit
105 camera
106 lamp color identification unit
107, 307 encoding unit
107d encoding device
108 image recording device
110, 110b, 210c, 310 signal control unit
111, 111b, 111c traffic signal
200a server
300 traffic control center
330 traffic control function unit
9000 computer
9010 CPU
9020 communication interface
9030 memory
9040 auxiliary storage device

What is claimed is:

1. An important region setting device comprising:
a memory storing instruction; and
one or more processors configured to execute the instructions to:
identify a lighting state of a lamp of a predetermined traffic signal from an image captured by a predetermined camera disposed at a position where the predetermined camera can capture the lamp of the predetermined traffic signal;
change an important region according to the lighting state of the lamp; and
notify the predetermined camera or a device that transmits the image captured by the predetermined camera of the important region,
wherein the important region is within a region covered by the predetermined camera, and is region information for encoding an image quality of the important region different from an image quality of a region other than the important region.

2. The important region setting device according to claim 1, wherein
the one or more processors are further configured to execute the instructions to:
change the important region by using step information indicating a lighting state of the lamp of the predetermined traffic signal.

3. The important region setting device according to claim 1, wherein
the one or more processors are further configured to execute the instructions to:
change the important region at a predetermined timing based on a change in the lighting state of the lamp of the predetermined traffic signal.

4. The important region setting device according to claim 1, wherein
the one or more processors are further configured to execute the instructions to:
switch the important region with reference to setting information containing a setting of a region including a crosswalk traversed by a vehicle turning right or left at an intersection.

5. The important region setting device according to claim 1, wherein the predetermined camera is installed on a side of a road.

6. An important region setting method executed by a computer, the method comprising:
identifying a lighting state of a lamp of a predetermined traffic signal from an image captured by a predetermined camera disposed at a position where the predetermined camera can capture the lamp of the predetermined traffic signal;
changing an important region according to the lighting state of the lamp; and
notifying the predetermined camera or a device that transmits the image captured by the predetermined camera of the important region,
wherein the important region is within a region covered by the predetermined camera, and is region information for encoding an image quality of the important region different from an image quality of a region other than the important region.

7. A non-transitory program recording medium storing a program for causing a computer to execute:
- identifying a lighting state of a lamp of a predetermined traffic signal from an image captured by a predetermined camera disposed at a position where the predetermined camera can capture the lamp of the predetermined traffic signal;
- changing an important region according to the lighting state of the lamp; and
- notifying the predetermined camera or a device that transmits the image captured by the predetermined camera of the important region,
- wherein the important region is within a region covered by the predetermined camera, and is region information for encoding an image quality of the important region different from an image quality of a region other than the important region.

* * * * *